US008234322B2

(12) United States Patent
Saito (10) Patent No.: US 8,234,322 B2
(45) Date of Patent: Jul. 31, 2012

(54) APPARATUS AND METHOD FOR GENERATING RANDOM NUMBERS

(75) Inventor: Takeshi Saito, Iruma (JP)

(73) Assignees: Leisure Electronics Technology Co., Ltd., Tokyo (JP); Institute for Advanced Studies Co., Ltd., Tokyo (JP); Mitsui & Co., Ltd., Tokyo (JP)

( * ) Notice: Subject to any disclaimer, the term of this patent is extended or adjusted under 35 U.S.C. 154(b) by 1941 days.

(21) Appl. No.: 11/058,725

(22) Filed: Feb. 14, 2005

(65) Prior Publication Data

US 2005/0198091 A1    Sep. 8, 2005

Related U.S. Application Data

(63) Continuation of application No. PCT/JP03/01100, filed on Feb. 4, 2003.

(30) Foreign Application Priority Data

Aug. 14, 2002    (JP) .................................. 2002-236689

(51) Int. Cl.
G06F 7/58    (2006.01)
(52) U.S. Cl. ....................................................... 708/250
(58) Field of Classification Search ........... 708/250–256
See application file for complete search history.

(56) References Cited

U.S. PATENT DOCUMENTS

| | | | |
|---|---|---|---|
| 3,124,753 A | | 3/1964 | Gieseler |
| 3,612,845 A * | 10/1971 | Lawlor | ........................... 708/256 |
| 6,542,014 B1 * | 4/2003 | Saito | ............................... 327/164 |
| 6,763,363 B1 * | 7/2004 | Driscoll | ........................ 708/252 |
| 7,080,106 B2 * | 7/2006 | Ikeda et al. | .................... 708/250 |
| 7,266,575 B2 * | 9/2007 | Ikeda | ............................ 708/250 |
| 2003/0018674 A1 * | 1/2003 | Figotin et al. | ................. 708/250 |
| 2003/0101205 A1 * | 5/2003 | Weimerskirch | ............... 708/250 |

FOREIGN PATENT DOCUMENTS

EP    1241565 A1    9/2002

(Continued)

OTHER PUBLICATIONS

Supplemental European Search Report for EP03788003, dated Aug. 24, 2007, 2 pages.
PCT International Search Report for PCT/JP03/01100, mailed May 20, 2003, 4 pages.
PCT Written Opinion of the International Preliminary Searching Authority for PCT/JP03/01100, mailed Oct. 28, 2003, 7 pages.

(Continued)

*Primary Examiner* — David H Malzahn
(74) *Attorney, Agent, or Firm* — Blakely, Sokoloff, Taylor & Zafman LLP (57) ABSTRACT

The present invention relates to a random-number generating apparatus and method for generating physical random numbers in accordance with noises randomly generated by a noise generating element, and allows for generating true random numbers at a high speed and uniformizing the generation frequency of each random number value, even in a simplified circuit configuration. The random-number generating apparatus is operable to amplify a waveform based on thermal noises generated in a thermal-noise generating element, and generate a random pulse at the time when the amplified output signal exceeds a given threshold from the state of being less than the threshold. The random-number generating apparatus is also provided with a reference-pulse generator for generating a reference pulse having a constant period, and a timer for measuring a time interval between the reference pulse and the random pulse. The measured value in the timer is output as a random number value.

8 Claims, 7 Drawing Sheets

FOREIGN PATENT DOCUMENTS

| | | |
|---|---|---|
| GB | 841 287 | 7/1960 |
| JP | 51-78159 A | 7/1976 |
| JP | 51-128239 | 11/1976 |
| JP | 57-45645 A | 3/1982 |
| JP | 11-296348 A | 10/1999 |
| JP | 2000-276329 A | 10/2000 |
| JP | 2000-305753 A | 11/2000 |
| JP | 2001-134422 A | 5/2001 |

OTHER PUBLICATIONS

PCT Notification of Transmittal of the International Preliminary Examination Report for PCT/JP03/01100, mailed Feb. 17, 2004, 9 pages.

Reply to PCT Written Opinion for PCT/JP03/01100, dated Dec. 26, 2003, 10 pages.

Amendment to PCT/JP03/01100, dated Dec. 26, 2003, 12 pages.

* cited by examiner

APPARATUS AND METHOD FOR GENERATING RANDOM NUMBERS

CROSS-REFERENCE TO RELATED APPLICATIONS

This is a continuation of prior PCT Patent Application No. PCT/JP2003/001100 filed on Feb. 4, 2003, which claims priority from Japanese Patent Application No. 2002-236689 filed on Aug. 14, 2002.

TECHNICAL FIELD

The present invention relates to an apparatus and method for generating physical random numbers in accordance with thermal noises to be randomly generated by a thermal-noise generating element comprising a resistor, a semiconductor or a conductor, or in accordance with light-based noises to be randomly generated by a light-emitting element, such as a LED or a PIN diode.

BACKGROUND ART

As one of methods for producing physical random numbers based on a natural phenomenon, there has been known a method using a resistor, a semiconductor such as a diode, or a conductor as a thermal-noise generating element. Thermal noises generated from the thermal-noise generating element are random in terms of both generation frequency and amplitude, and thereby physical random numbers can be produced in accordance with the thermal noises. Various random-number generating apparatuses utilizing such a thermal-noise generating element are disclosed in a number of publications.

The most typical method for generating physical random numbers by use of a thermal-noise generating element comprises amplifying and sampling thermal noises output from a thermal-noise generating element at a certain moment, and comparing each of the sampled values with a given threshold to produce random numbers. Specifically, thermal noises output from a thermal-noise generating element are amplified and sampled in constant periods. Then, physical random numbers can be produced in a digital manner according to a predetermined rule that "1" will be assigned to the sampled value if it is greater than a given threshold, and "0" will be assigned to the sampled value if it is not greater than the threshold.

As another method for generating physical random numbers by use of a thermal-noise generating element, there has been known a method comprising measuring a time interval between respective times when one of thermal noises to be randomly generated exceeds a given threshold and a subsequent one of the thermal noises exceeds the threshold, and directly extracting the temporal measurement value as a random number value. One example of a random-number generating apparatus based on this method is described in Japanese Patent Laid-Open Publication No. 2001-134422.

This random-number generating apparatus comprises a first circuit for amplifying a thermal noise output from a thermal-noise generating element and generating a rectangular pulse which rises at the moment when the height of the pulse exceeds a given threshold, a second circuit for generating clocks having a substantially higher frequency than that of the pulse, and a counter for counting the clocks. The number of clocks generated in the period between the generation of one pulse and the generation of a subsequent pulse is counted, and the counted value is extracted as a random number. However, the number of bits in a counter is limited (assuming that it is n bits), and thereby, when the counter counts $2^n$ times, it is reset to restart counting from 1. Thus, the number of different varieties of actually produced random number values is $2^n$. According to this method, n bits of random numbers are generated per one pulse based on a thermal noise, so that random numbers can be generated at a higher speed as compared with the method based on momentarily sampling a thermal noise.

However, in the method based on measuring a time interval, the measured time intervals exhibit an exponential distribution, which causes a slight non-uniformity in the generation frequency of each random number value obtained in accordance with the measured time interval. While this level of non-uniformity has been ignored, it is desirable to eliminate such non-uniformity so as to produce a better random number.

Further, if it is attempted to increase the number of random numbers to be produced per unit time, or generate random numbers at a higher speed, successive pulses based on thermal noises will be frequently generated in such a manner as to temporally get closer to each other. In this case, due to the frequency characteristic of an amplifier circuit, it is likely that it will be difficult to recognize these pulses through a circuit-based technique. Thus, the generation frequency of a small value before the completion of one cycle of a counting operation of the counter is slightly lowered. This becomes one of the factors causing non-uniformity in a generation frequency.

In view of the above technical background, it is an object of the present invention to provide a random-number generating apparatus and method capable of generating a random number at a higher speed and uniformizing the generation frequency of each random number value, even in a simplified circuit configuration.

DISCLOSURE OF INVENTION

In order to achieve the above object, the present invention provides a random-number generating apparatus comprising a noise generating element, an amplifier for amplifying a waveform based on a noise generated in the noise generating element, a random-pulse generator for generating a random pulse when an output signal from the amplifier exceeds a given threshold from the state of being less than the threshold, or falls below the threshold from the state of being greater than the threshold, a reference-pulse generator for generating a reference pulse having a constant period, and a timer for measuring a time interval between the reference pulse and the random pulse. This random-number generating apparatus is operable to output the measured value in the timer as a random number value.

In the above random-number generating apparatus, the timer may include a clock-signal generator for generating a clock signal having a higher frequency than that of the reference pulse, and a counter for counting the number of clocks of the clock signal, wherein a counted value obtained by counting the number of clocks in the time interval between the reference pulse and the random pulse is used as the measured value.

In order to achieve the above object, the present invention further provides a random-number generating apparatus comprising a noise generating element, an amplifier for amplifying a waveform based on a noise generated in the noise generating element, first random-pulse generator for generating a first random pulse when an output signal from the amplifier exceeds a given threshold from the state of being less than the threshold, second random-pulse generator for generating a second random pulse when an output signal from the amplifier falls below a given threshold from the state of being greater than the threshold, a reference-pulse generator for generating a reference pulse having a constant period, a clock-signal generator for generating a clock signal having a higher frequency than that of the reference pulse, first and second counters for counting the number of clocks in the clock signal, respectively, in opposite directions, and an operator for performing an exclusive-OR operation. In this random-number generating apparatus, the first counter is operable to count the number of clocks in a time interval between the reference pulse and the first random pulse, and the second counter is operable to count the number of clocks in a time interval between the reference pulse and the second random pulse. Further, the operator is operable to perform the exclusive-OR operation for the respective counted values of the first counter and the second counter at each corresponding digit position, and output the operation result as a random number.

The present invention may also be designed to provide two or more of the above random-number generating apparatuses, and lump the respective random numbers generated by these random-number generating apparatuses together as one random number, so as to increase a speed in generating random numbers.

The noise generating element may be a thermal-noise generating element or a light-emitting element. The random number noise may be generated in accordance with a thermal noise when the thermal-noise generating element is used, or in accordance with a light-based noise when the light-emitting element is used.

BRIEF DESCRIPTION OF DRAWINGS

FIG. 2(A) is a schematic waveform chart showing the microscopic potential variation based on thermal noises generated across a thermal-noise generating element 10.

FIG. 2(B) is a schematic waveform chart showing a thermal noise amplified by an amplifier 12.

FIG. 2(C) is a schematic waveform chart showing a random pulse output from a random pulse generator 14a.

BEST MODE FOR CARRYING OUT THE INVENTION

Figure 1:
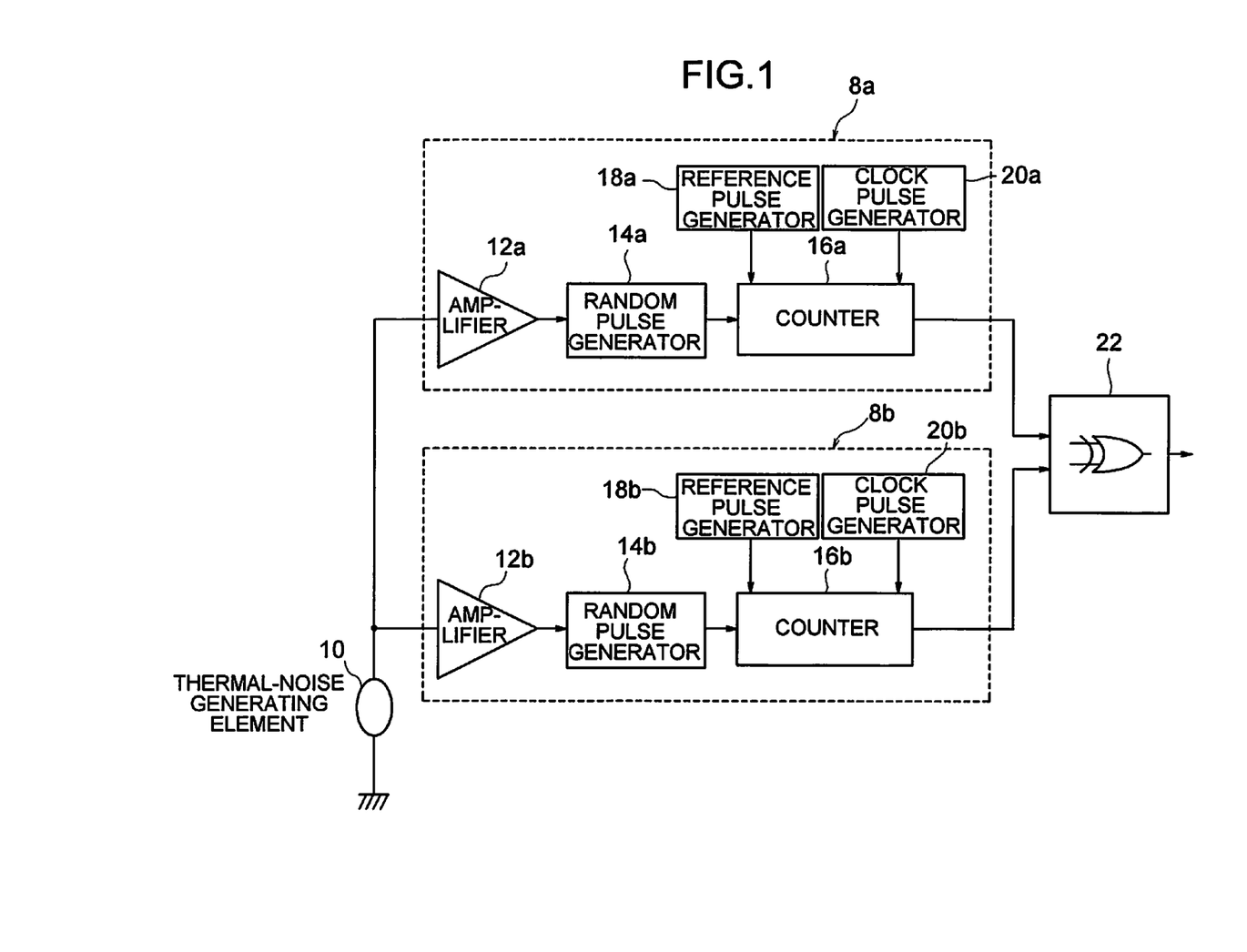
FIG. 1 is a block diagram of a random-number generating circuit according to one embodiment of the present invention.

With reference to the drawings, one embodiment of the present invention will now be described. FIG. 1 is a block diagram showing a random-number generating circuit according to one embodiment of the present invention. The random-number generating circuit in FIG. 1 comprises two random-number generation sections indicated by the reference numerals 8a and 8b (the former will hereinafter be referred to as an "A-type random-number generation section" and the latter as a "B-type random-number generation section", respectively), and each of them is operable to generate random numbers in accordance with a single common thermal-noise generating element 10. In the following description, when there is no need for distinguishing between the A-type and the B-type, each of these random-number generation sections and their circuit components is indicated, for example, simply as a "random-number generation section 8" by omitting the suffix a, b. The thermal-noise generating element 10 may be provided in each of the random-number generation sections.

In the block diagram of FIG. 1, the thermal-noise generating element 10 is an element for outputting a pulsed potential variation based on thermal noises, and a resistor is typically used as the thermal-noise generating element in many cases. Generally, the generation of thermal noises is regarded as a random phenomenon. In the circuit of FIG. 1, no voltage is applied across the thermal-noise generating element 10 to eliminate a risk that an externally applied voltage will adversely affect the potential variation across the thermal-noise generating element to spoil the genuineness of a physical random number.

Each of the reference numerals 12a, 12b indicates an amplifier for amplifying a thermal noise generated in the thermal-noise generating element 10, and each of the reference numerals 14a, 14b indicates a random pulse generator for generating a random pulse in accordance with the thermal noise. Each of the reference numerals 20a, 20b indicates a clock pulse generator for generating a clock pulse, and each of the reference numerals 16a, 16b indicates a counter for counting the clock pulse. Each of the reference numerals 18a, 18b indicates a reference pulse generator for triggering a counting operation in each of the counters 16a, 16b. Instead of providing the separate clock pulse generators as in FIG. 1, the random-number generating circuit may have a single common clock pulse generator.

Figure 2:
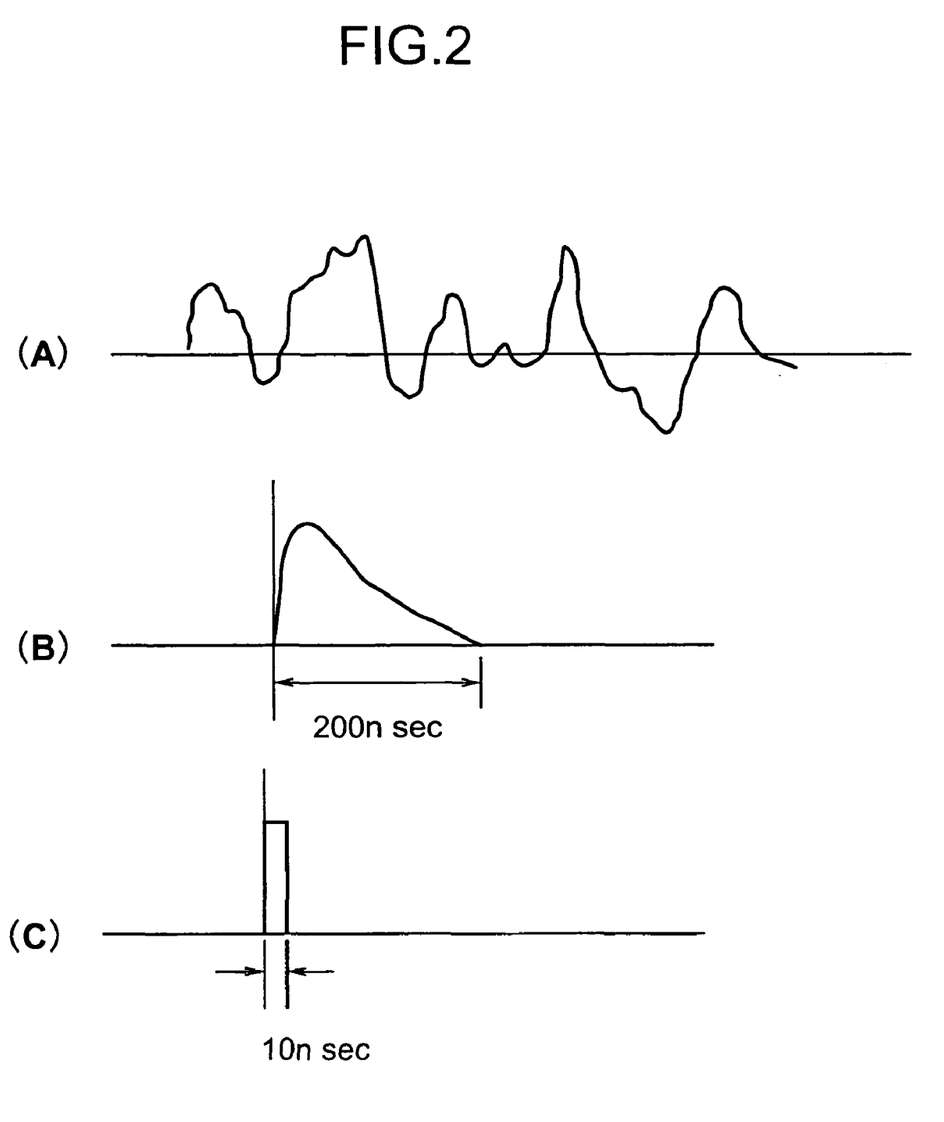

FIG. 2(A) schematically shows the waveform of the microscopic potential variation based on thermal noises generated across the thermal-noise generating element 10. As shown in this figure, each of the thermal noises is random in terms of both temporal width and generation frequency. In practice, this potential variation is extremely minute, and thereby the waveform of the potential variation before the amplification cannot be observed in this form.

In the block diagram of FIG. 1, the amplifier 12 is operable to amplify the thermal noises generated across the thermal-noise generating element 10. As described above, the thermal noises are a microscopic potential variation. Thus, in order to obtain a required amplification degree, the amplifier 12 may be composed of a multistage amplifier circuit, for example, comprising a preamplifier circuit and a main amplifier circuit.

FIG. 2(B) schematically shows the waveform of the thermal noise amplified by the amplifier 12. An actual amplifier circuit has restrictions in a frequency characteristic and amplification degree, and thereby the thermal-noise-based waveform cannot be truly amplified. Specifically, in an output of the amplifier circuit, a high-speed potential variation having the higher frequency than an amplifiable frequency band or extremely minute potential variation will be cancelled. Further, the width of the thermal-noise-based pulse output from the amplifier circuit is affected by a time constant inherent in the amplifier circuit. Thus, the waveform illustrated in FIG. 2(B) is obtained under such influences of the characteristics of the amplifier circuit 12. As shown in FIG. 2(B), the duration of the obtained pulse is about 200 nanoseconds.

In the block diagram of FIG. 1, the random pulse generator 14 is operable to extract a pulse having a constant temporal width (hereinafter referred to as a "random pulse") from the randomly generated thermal noises at the time when the output of the amplifier 12 exceeds a predetermined threshold. Generally, if this threshold is set at a higher value, the number of random pulses to be obtained will be reduced, and a speed in generating a desired number of random numbers or a random-number generation speed will becomes lower, while an effect of eliminating influences by noises other than thermal noises or the like will be enhanced. Conversely, if this threshold is set at a lower value, the number of random pulses to be obtained will be increased, and the random-number generation speed will becomes higher, while noises adversely affecting the genuineness of a random number will be liable to be picked up. Thus, the threshold is determined by taking account of an actual application.

The random pulse generator 14a is operable to generate a random pulse which rises at the time when the thermal-noise-based waveform exceeds a given threshold. The random pulse generator 14b is operable to generate a random pulse which rises at the time when the thermal-noise-based waveform falls below a given threshold from the state of being greater than the threshold. The respective thresholds in the random pulse generators 14a, 14b may be identical to one another, or may be different from one another.

FIG. 2(C) schematically shows the waveform of the random pulse output from the random pulse generator 14a. Each of the random pulse generators 14a, 14b is configured to generate a random pulse having a pulse width of 10 nanoseconds as shown in FIG. 2(C). While the random pulse is based on thermal noises, it is finally obtained by subjecting the thermal-noise-based signal to a circuit-based processing. Thus, it is required to separately verify whether the generation frequency of the random pulse is actually random.

In the block diagram of FIG. 1, each reference pulse generated from the reference pulse generators 18a, 18b serves as a trigger pulse for allowing a counting operation in each of the counters 16a, 16b to be initiated. In this embodiment, each of the counters 16a, 16b is described on the assumption that it is a 4-bit counter. Each of the clock pulse generators 20a, 20b is configured to constantly generate a clock pulse having a substantially higher frequency than (e.g. about 300 times) the reference pulse to be generated by each of the reference pulse generators 18a, 18b. The counter 16a is a forward counter configured to increment one by one every time one clock pulse is entered therein. The counter 16b is a reverse counter configured to decrement one by one every time one clock pulse is entered therein. Further, each of these counters is configured to be reset every time the counting operation for 4 bits (or for counting up to 16) is completed, and re-count from the beginning.

One of the features of the random-number generating circuit is that the pair of reference pulse generators 18a, 18b and the forward and reverse counters 16a, 16b are provided as described above.

Given that an average number of generated random pulses is about 10,000 per second, an average time interval between one random pulse and a subsequent random pulse is about 100 microseconds. In this case, each of the reference pulse generators 18a, 18b generates a reference pulse having a period equivalent to this average time interval of about 100 microseconds. While each of the counters 16a, 16b in this embodiment is described as a 4-bit counter, it is no more than one example, and may be any other suitable counter, such as an 8-bit counter or a 16-bit counter.

Figure 3:
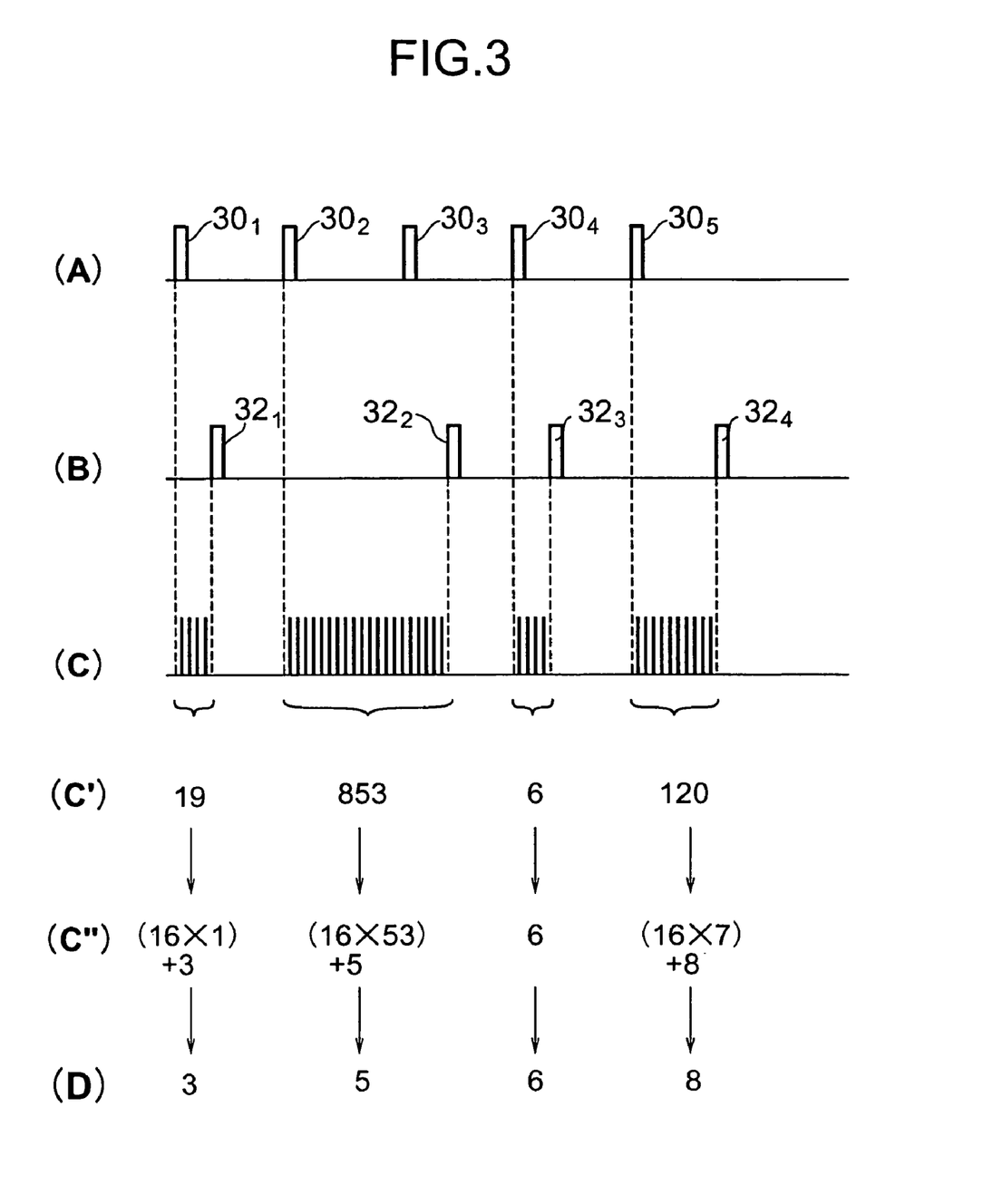
FIG. 3 are explanatory diagrams of waveforms in respective components of an A-type random-number generation section 8a illustrated in the upper portion of FIG. 1.

FIG. 3 are explanatory diagrams of waveforms in the respective components of the A-type random-number generation section 8a illustrated in the upper portion of FIG. 1, or more particularly, explanatory diagrams of the relationship between reference pulses (A) generated from the reference pulse generator 18a, random pulses (B) generated from the random pulse generator 14a, clock pulses (C) generated from the clock pulse generator 20a, and counted values (D) counted by the counter 16a. The same applies to random-number generation section 8b illustrated in the lower portion of FIG. 1, and thus explanation of the waveforms in random-number generation section 8b will be omitted herein.

In response to the generating of a reference pulse 30, from the reference pulse generator 18a as in (A) of FIG. 3, the counter 16a starts a clock-pulse counting operation. Then, when a random pulse $32_1$ based on thermal noises is generated in the random pulse generator 14a, and entered into the counter 16a, the counter 16a stops the counting operation. Given that the number of clock pulses generated during the counting operation is "19", the counted value of the 4-bit counter 16a is "3" as a fraction resulting from a calculation of dividing "19" by "16 ($=2^4$)".

Then, in response to the generation of a reference pulse $30_2$, the counter 16a starts a clock-pulse counting operation. If no random pulse is entered into the counter 16a before the generation of a subsequent reference pulse $30_3$, the counter 16a will continue the counting operation, and will stop the counting operation at the time when a random pulse $32_2$ is entered thereto. Given that the number of clock pulses generated in this counting operation is "853", the counted value of the 4-bit counter 16a is "5" as a fraction resulting from a calculation of dividing "853" by "16 ($=2^4$)".

Further, given that the number of clock pulses generated in a time interval between the generation of a reference pulse $30_4$ and the generation of a random pulse $32_3$ is "6", the counted value of the 4-bit counter 16a is "6" as a fraction resulting from a calculation of dividing "6" by "16 ($=2^4$)". In the same way, given that the number of clock pulses generated in a time interval between the generation of a reference pulse 305 and the generation of a random pulse 324 is "120", the counted value of the 4-bit counter 16a is "8" as a fraction resulting from a calculation of dividing "120" by "16 ($=2^4$)".

In the above operation, it is worth noting that the counted values of the 4-bit counter 16a illustrated in (D) of FIG. 3, or "3", "5", "6" and "8", are used directly as random number values. In the same manner, counted values of the reverse counter or the 4-bit counter 16b in the random-number generation section 8b illustrated in the lower portion of FIG. 1 are also used directly as random number values. In addition, the respective random number values obtained as the counted values of the forward and reverse counters are independent from one another. Thus, two different random number values can be obtained during one period of the thermal-noise-based waveform from the single thermal-noise generating element.

A method for verifying whether the random number obtained in the above way is a true random number will be explained. According to a known mathematical theory, the fact that a plurality of random number values accumulated over a given time-period are distributed in conformity to a Poisson distribution may be demonstrated to verify that an obtained random number is a true random number. If there are an extremely large number of individual values as in this embodiment, the fact that the obtained values are distributed in conformity to a Gaussian distribution may be demonstrated, because a Poisson distribution can be approximated by a Gaussian distribution in such a case.

Figure 4:
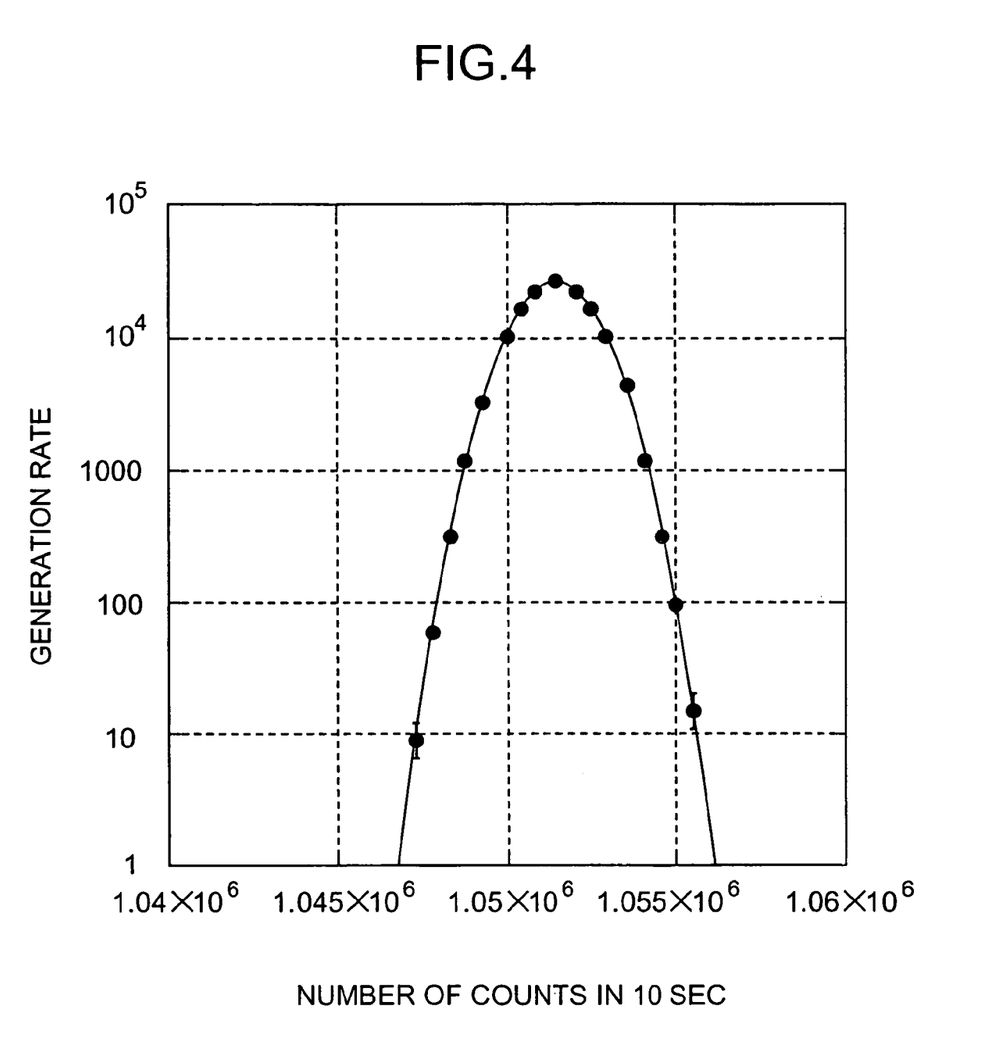
FIG. 4 is a graph showing the result of a test using a random-number generating apparatus designed to generate about 100,000 thermal-noise-based pulses per second on an average, wherein the number of generated random numbers was counted for 10 seconds, and this counting operation was successively repeated 135,000 times.

FIG. 4 shows the result of a test using a random-number generating apparatus designed to generate about 100,000 thermal-noise-based pulses per second on an average, wherein the number of generated random numbers was counted for 10 seconds (or an average number of counted values was about 1,000,000), and this counting operation was successively repeated 135,000 times. Each of the test values is plotted on this figure as one black dot. The curve indicated by a solid line in FIG. 4 represents a Gaussian distribution having a deviation σ of 1,025. It should be noted that the scale of the generation frequency on the vertical axis of FIG. 4 is a logarithmic value.

As seen in FIG. 4, the black dots are adequately located on the curve representing the Gaussian distribution. Thus, a deviation σ is as follows:

$$\sigma = N^{1/2} = 1,025$$

This verifies that if a signal based on thermal noises, which are a random phenomenon, is subjected to a circuit-based processing, an excellent random number can be obtained.

Figure 5:
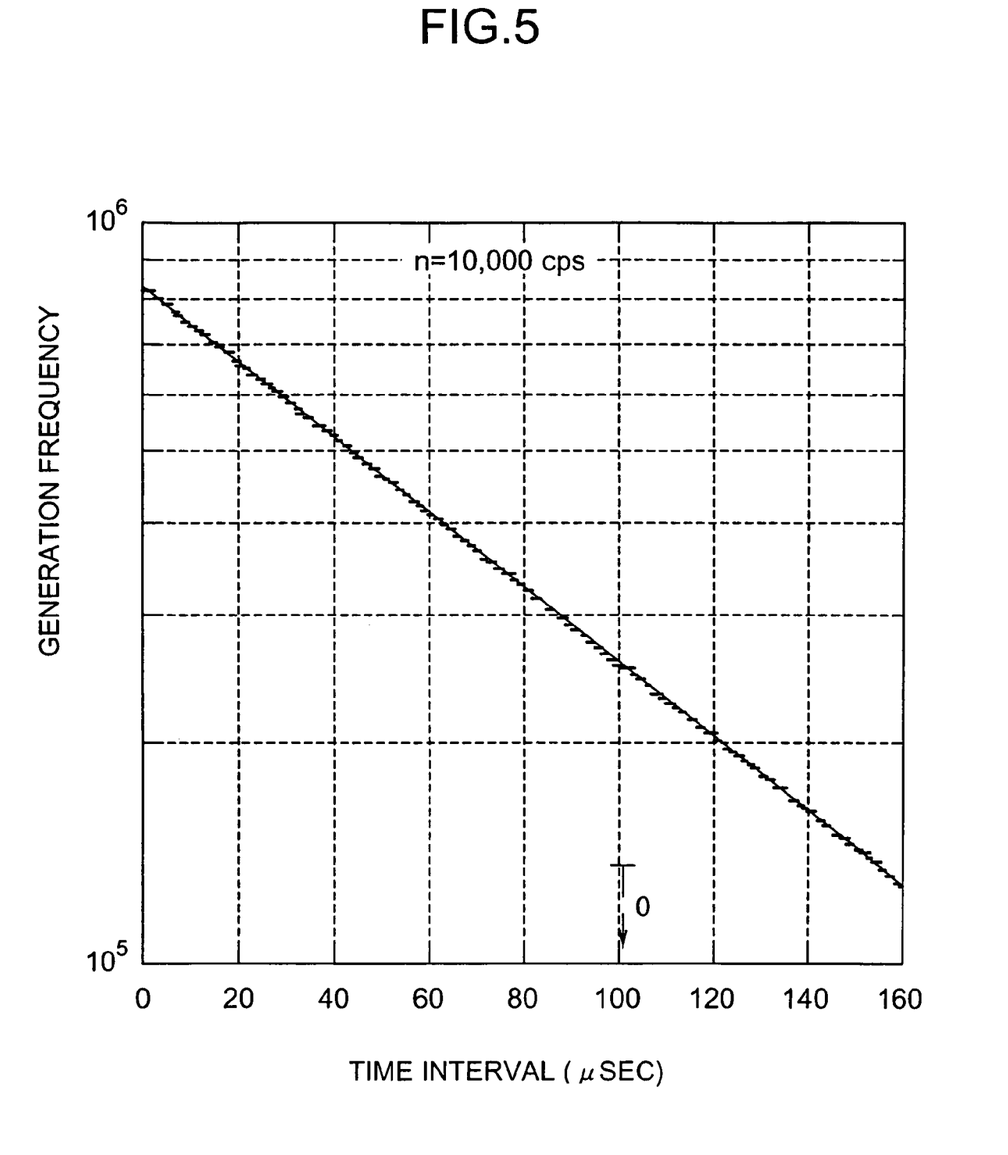
FIG. 5 is a graph showing the result of a test using a random-number generating apparatus designed to generate about 10,000 thermal-noise-based pulses per second on an average, wherein a time interval between one reference pulse and each random pulse was measured in accordance with the number of counted clock pulses.

It is also mathematically known that if a value obtained by measuring a time interval between a reference pulse and a random pulse is a true random number, as in this embodiment, the time intervals will exhibit an exponential distribution. FIG. 5 is a graph showing the result of a test using a random-number generating apparatus designed to generate about 10,000 thermal-noise-based pulses per second on an average, wherein a time interval between one reference pulse and each random pulse was measured in accordance with the number of counted clock pulses. Each of the dots in this figure indicate the generation frequency of a respective time interval. In FIG. 5, the scale of the generation frequency on the vertical axis is a logarithmic value.

As is clear from the test result in FIG. 5, the dots indicating the respective generation frequencies of time intervals form a straight line, and thus it can be said that the generation frequency of each corresponding random number has an exponentially reduced distribution, because the vertical axis of FIG. 5 is a logarithmic value. This proves that a random number generated in accordance with thermal noises by use of a random-number generating apparatus according to this embodiment is a true random number.

An exponential distribution as shown in FIG. 5 can be expressed as a distribution proportional to $\exp(-t/T_0)$, wherein t of the horizontal axis is a time interval, and $T_0$ is an average value of time intervals between adjacent thermal noises. An average number of generated thermal noises is about 10,000, and thereby $T_0$ is $\sim(1/10,000) = 100$ µsec. This average time interval To is indicated by an arrow in FIG. 5.

The time interval between thermal noises which exhibits an exponential distribution as shown in FIG. 5 means that, if the measured value of the time interval is used as a random number, the generation frequency of each random number is not fully uniformed, or the probability of generating a larger value is slightly lowered. However, in an actual random-number generating apparatus, only an extremely narrow time-interval range of zero to about several µsec on the horizontal axis of FIG. 5 is used in generating random numbers, and thereby the non-uniformity in the generation frequency of each random number value is extremely small.

As mentioned above, in the present invention, a reference pulse is introduced. Then, a time interval between the reference pulse and a random pulse is measured, and the measured value is directly extracted as a random number. The introduction of the reference pulse in this manner provides the following advantages.

The width of a thermal-noise-based pulse output from the amplifier circuit 12 is about 200 nanoseconds as described above. This pulse width is at least partly dependent on the high-frequency characteristic of the amplifier circuit 12. In this case (see FIG. 2(B)), if a time interval between adjacent random pulses is measured without introducing the reference pulse, and the measured value is output as a random number value, and thermal-noise-based pulses are successively generated within a short time-period of about 200 nanoseconds, the adjacent pulses cannot be distinguished from one another. Thus, a small value, such as "0", "1" or "2", before the counter is reset in response to completion of one cycle of the counting operation, cannot be extracted. While it is understood that many of these values are generated because the counter is reset to re-count from the beginning, the generation frequency of these values is inevitably lowered as compared to that of other values. This causes non-uniformity in the generation frequency of each random number value.

In contrast, the random-number generating apparatus of the present invention designed to introduce a reference pulse to be generated at a constant period, and use the reference pulse as a trigger pulse for allowing the counter to start a counting operation, can adequately measure a time interval even if it is somewhat shorter than 200 nanoseconds. Thus, even a small value, such as "0", "1" or "2", before the counter is reset in response to completion of one cycle of the counting operation, can be extracted. As a result, the high-frequency characteristic of the amplifier circuit 12 is improved. Due to this improvement, the non-uniformity in the generation frequency of each random number value, particularly a small value is deleted.

Further, the random-number generating circuit illustrated in FIG. 1 is provided with an exclusive-OR circuit 22. This exclusive-OR circuit 22 is operable to subject respective values of the forward counter 16a and the reverse counter 16b at each corresponding digit position to an exclusive-OR operation, and extract the obtained 4-bit value as a random number value. For example, considering the first digit position, if the counter 16a and the counter 16b commonly have a value of "0 (zero)" at the first digit position, the result of the exclusive-OR operation will be "1". If the counter 16a and the counter 16b commonly have a value "1" at the first digit position, the result of the exclusive-OR operation will be "1". If one of the counter 16a and the counter 16b has a value "0" at the first digit position, and the other counter has a value "1" at the first digit position, the result of the exclusive-OR operation will be "0". The same applies to another digit position.

The random-number generating apparatus designed to subject respective values of the forward counter 16a and the reverse counter 16b at each corresponding digit position to an exclusive-OR operation, and use the result of the exclusive-OR operation as a final random number value can achieve the following effects.

Figure 6:
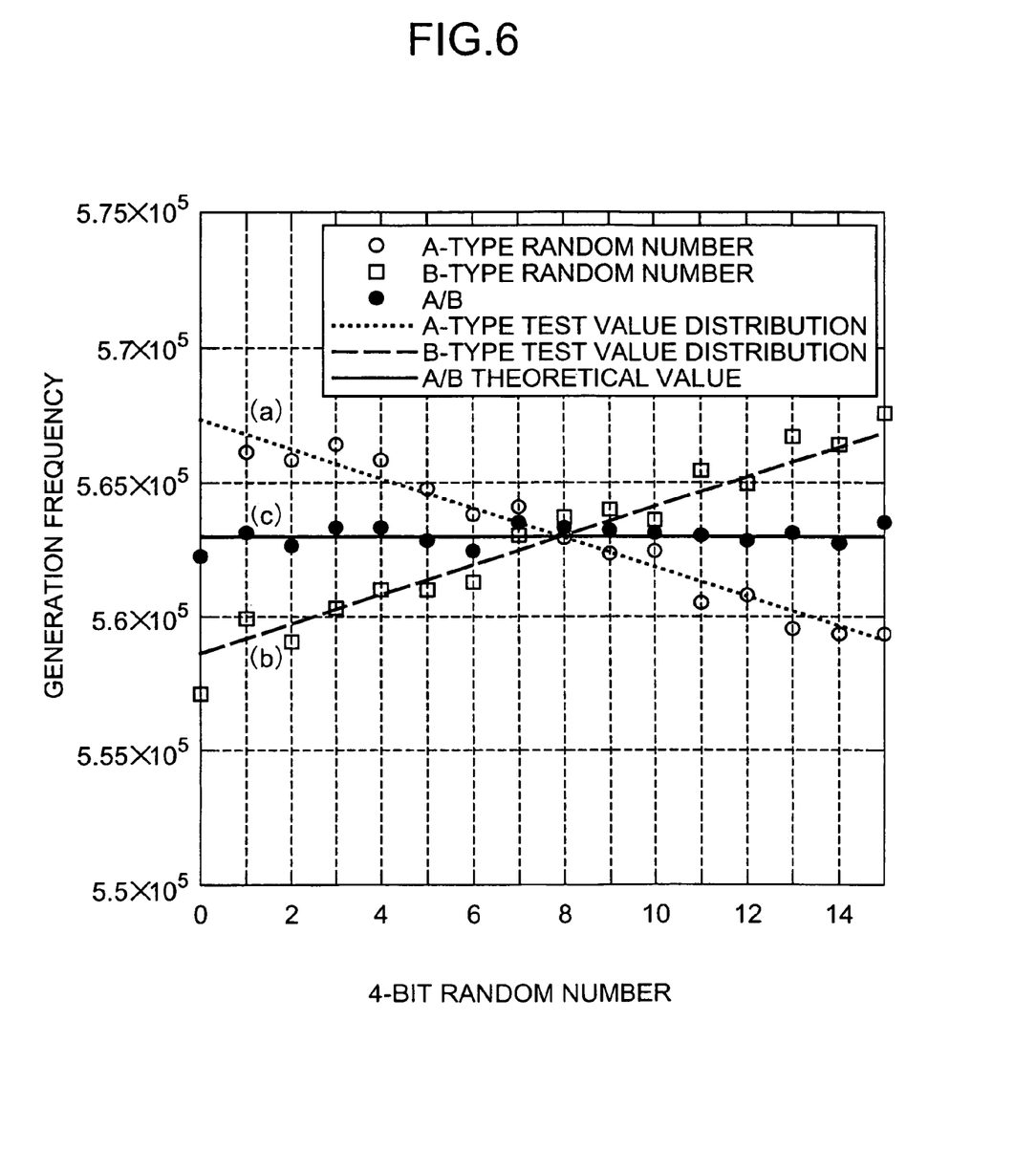
FIG. 6 is a graph showing the distribution of random numbers obtained by performing a test of actually generating random numbers by use of the random-number generating circuit in FIG. 1.

FIG. 6 shows the distribution of random numbers obtained by performing a test of actually generating random numbers by use of the random-number generating circuit in FIG. 1. The random-number generating apparatus used in the test in FIG. 6 is designed to generate a clock pulse at a frequency F of 100 MHz, and about 100,000 random pulses per second. The line (a) in FIG. 6 indicates the distribution of generation frequencies of respective counted values in the forward counter 16a. As seen in the line (a), the distribution slightly, but clearly, exhibits a downward inclination, and the generation frequency is lowered as the counted value is increased. This inclination is theoretically $-N/F=-0.001$. When the inclination of the line (a) in FIG. 6 is actually calculated while taking account of the vertical axis of FIG. 6 represented by a logarithmic value, it is $-0.001030$, which proves it to be in excellent conformity with the theoretical value.

The line (b) in FIG. 6 indicates the distribution of generation frequencies of respective counted values in the reverse counter 16b. As indicated by the line (b), the distribution slightly, but clearly, exhibits an upward inclination. That is, the generation frequency of each 4-bit counted value is increased as the counted value becomes larger. This inclination is theoretically $N/F=0.001$. When the inclination of the line (b) in FIG. 6 is actually calculated, it is $0.001094$, which proves it to be in excellent conformity with the theoretical value.

The line (c) in FIG. 6 indicates the distribution of values obtained by performing an exclusive-OR operation for the respective counted values of the forward counter 16a and the reverse counter 16b at each corresponding digit position. As seen in the line (c), the distribution forms a substantially horizontal line. That is, the 4-bit random number value obtained as the result of the exclusive-OR operation can be considered to be a substantially perfect or true random number having a uniformized generation frequency.

Figure 7:
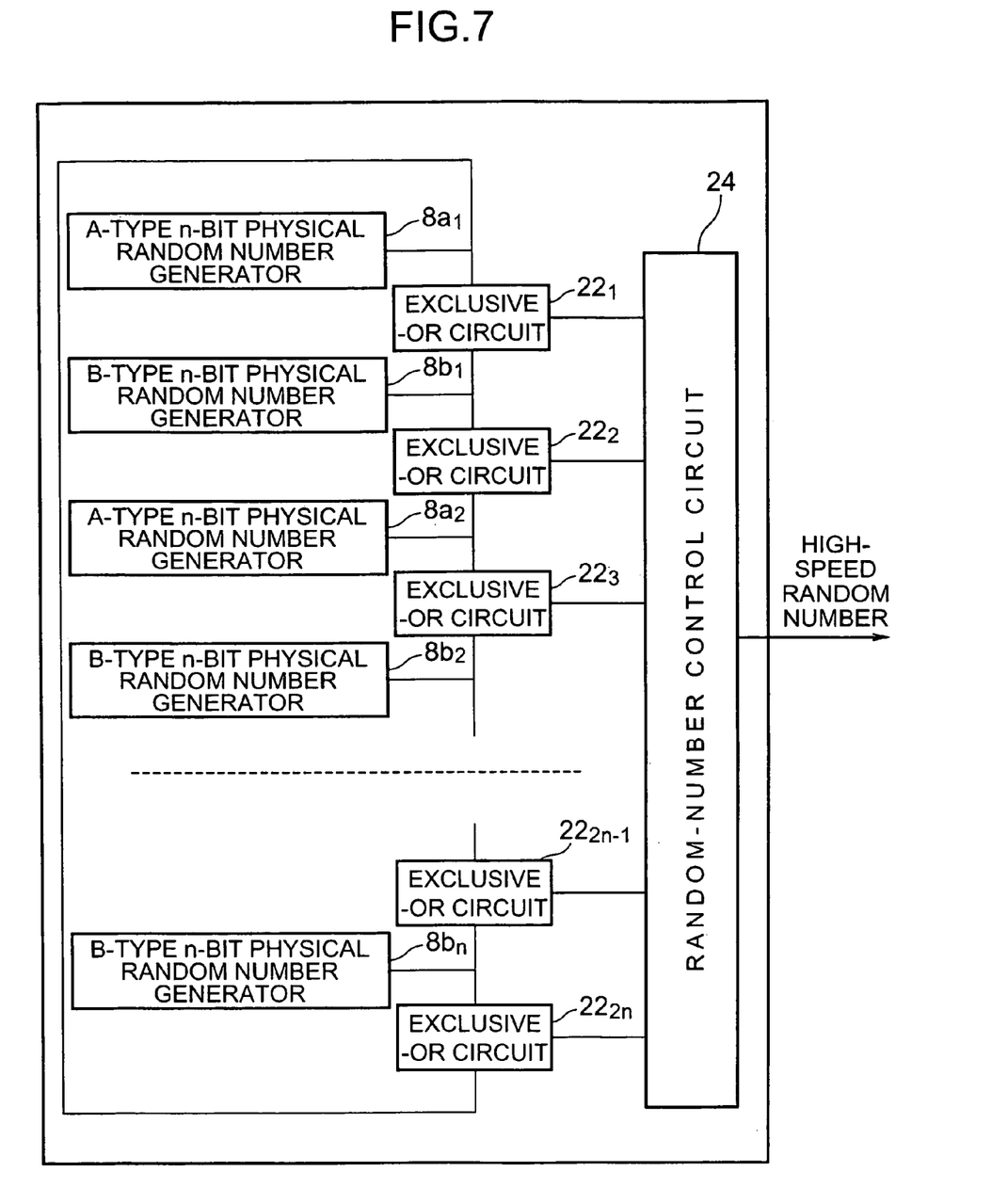
FIG. 7 is a block diagram showing a random-number generating circuit provided with a plural number of the random-number generating circuits illustrated in FIG. 1, and configured to lump the respective random number values obtained from these random-number generating circuits together as one random number value to be output.

FIG. 7 shows a random-number generating circuit obtained by connecting a plural number of the random-number generating circuits illustrated in FIG. 1, and lumping the respective random number values obtained from these random-number generating circuits together as one random number value to be output. In FIG. 7, each of the reference numerals $8a_1$, $8a_2$, - - -, $8a_n$ indicates an A-type random-number generation section, and each of the reference numerals $8b_1$, $8b_2$, - - -, $8b_n$ indicates a B-type random-number generation section. Each of the reference numerals $22_1$, $22_2$, - - -, $22_{2n}$ indicates an exclusive-OR circuit. The reference numeral 24 indicates a random-number control circuit for controlling the extraction of random numbers.

When a plurality of independent random-number generating circuits are connected with each other, a speed in generating random numbers can be increased in proportion to the number. In this case, a high-speed random number to be obtained by this circuit can have further enhanced uniformity by connecting a plural number of the random-number generating circuits each originally having a uniformized generation frequency of each random number value, as indicated by the line (c) in FIG. 6. Thus, when a plural number of the random-number generating circuits illustrated in FIG. 1 are connected with each other to provide an increased speed in generating random numbers, the integrity of physical random numbers can be advantageously maintained.

The present invention is not limited to the above embodiment, as various changes and modifications can be made within the spirit and scope of the invention as set forth in appended claims. Therefore, it is intended that such changes and modifications are also encompassed within the technical scope of the present invention.

For example, while the random-number generating apparatus in the above embodiment has been designed to use a reference pulse as a trigger pulse for allowing a counting operation in each of the counters 16a, 16b to be initiated, and stop the counting operation when a random pulse is entered in each of the counters, it may be designed in a reverse way or to use the random pulse as the trigger pulse for allowing a counting operation to be initiated, and stop the counting operation when the reference pulse is entered in each of the counters. Further, while the random-number generating apparatus in the above embodiment has been designed such that a value obtained by performing an exclusive-OR operation for the respective counted values of the counters 16a, 16b at each corresponding digit position is output as a final random number value, each of the counted values of the counters 16a, 16b may be directly output as a final random number value.

Furthermore, while the above embodiment has been described in connection with a case where a physical random number is generated in accordance with thermal noises from a thermal-noise generating element, the present invention may also be applied to a case where a time interval between adjacent light-based noises randomly generated from a light-emitting element, such as an LED or a PIN diode, is measured, and a physical value is generated in accordance with the measured value.

INDUSTRIAL APPLICABILITY

According to the present invention, a physical random number is produced in accordance with thermal noises randomly generated by a thermal-noise generating element or light-based noises randomly generated by a light-emitting element. Thus, the physical random number can be generated in a simplified circuit configuration. In addition, the present invention can achieve a higher speed in generating random numbers and a uniformized generation frequency of each random number value. The present invention can be suitably applied to various simulations utilizing random numbers, such as derivatives, strength simulation for buildings, weather forecasting, or advanced game machines utilizing simulations.

What is claimed:

1. A random-number generating apparatus, comprising:
    a noise generating element;
    an amplifier to amplify a waveform based on a noise generated in said noise generating element;
    a random-pulse generator to generate a random pulse when an output signal from said amplifier exceeds a given threshold from the state of being less than said threshold, or falls below said threshold from the state of being greater than said threshold;
    a reference-pulse generator to generate a reference pulse having a constant period; and
    a timer to measure a time interval between said reference pulse and said random pulse, wherein the measured value in said timer is output as a random number value, wherein said timer includes a clock-signal generator to generate a clock signal having a higher frequency than that of said reference pulse, and a counter for counting the number of clocks of said clock signal, wherein a counted value obtained by counting the number of clocks in the time interval between said reference pulse and said random pulse is output as a random number value.

2. The random-number generating apparatus as defined in claim 1, further comprising:

a second amplifier to amplify the waveform based on the noise generated in said noise generating element;

a second random-pulse generator to generate a second random pulse when an output signal from said second amplifier exceeds said threshold from the state of being less than said threshold, or falls below said threshold from the state of being greater than said threshold;

a second reference-pulse generator to generate a second reference pulse having a constant period;

a second timer to measure a time interval between said second reference pulse and said second random pulse, wherein said second timer includes a second clock-signal generator to generate a second clock signal having a higher frequency than that of said second reference pulse, and a second counter for counting the number of clocks of said second clock signal, wherein a second counted value obtained by counting the number of clocks in the time interval between said second reference pulse and said second random pulse is output as a second random number value; and means for lumping the respective random numbers together as one random number to increase a speed in generating random numbers.

3. The random-number generating apparatus as defined in claim 1, wherein said noise generating element is a thermal-noise generating element, and said noise is a thermal noise.

4. The random-number generating apparatus as defined in claim 1, wherein said noise generating element is a light-emitting element, and said noise is a noise based on light.

5. A random-number generating apparatus, comprising:

a noise generating element;

an amplifier to amplify a waveform based on a noise generated in said noise generating element;

first random-pulse generator to generate a first random pulse when an output signal from said amplifier exceeds a given threshold from the state of being less than said threshold;

second random-pulse generator to generate a second random pulse when an output signal from said amplifier falls below a given threshold from the state of being greater than said threshold;

a reference-pulse generator to generate a reference pulse having a constant period; and a clock-signal generator to generate a clock signal having a higher frequency than that of said reference pulse;

first and second counters to count the number of clocks in said clock signal, respectively, in opposite directions; and an operator to perform an exclusive-OR operation, wherein:

said first counter is operable to count the number of clocks in a time interval between said reference pulse and said first random pulse;

said second counter is operable to count the number of clocks in a time interval between said reference pulse and said second random pulse; and said operator is operable to perform the exclusive-OR operation for the respective counted values of said first counter and said second counter at each corresponding digit position, and output the operation result as a random number.

6. A method for generating random numbers, comprising the steps of:

generating a random pulse in accordance with the generation of a noise in a noise generating element;

generating a reference pulse having a constant period; and measuring a time interval between said reference pulse and said random pulse by counting a number of clock pulses having a higher frequency than that of said reference pulse, and outputting the measured value as a random number value.

7. The method as defined in claim 6, wherein said noise generating element is a thermal-noise generating element, and said noise is a thermal noise.

8. The method as defined in claim 6, wherein said noise generating element is a light-emitting element, and said noise is a noise based on light.

* * * * *